(12) United States Patent
Neef et al.

(10) Patent No.: US 8,620,584 B2
(45) Date of Patent: Dec. 31, 2013

(54) NAVIGATION DEVICE AND METHOD FOR EXCHANGING DATA BETWEEN RESIDENT APPLICATIONS

(75) Inventors: Edwin Neef, Amsterdam (NL); Mark Gretton, London (GB)

(73) Assignee: TomTom International B.V., Amsterdam (NL)

( * ) Notice: Subject to any disclaimer, the term of this patent is extended or adjusted under 35 U.S.C. 154(b) by 690 days.

(21) Appl. No.: 12/457,906

(22) Filed: Jun. 25, 2009

(65) Prior Publication Data

US 2009/0326803 A1  Dec. 31, 2009

Related U.S. Application Data

(62) Division of application No. 10/546,740, filed as application No. PCT/GB2004/000800 on Feb. 26, 2004, now Pat. No. 7,606,663.

(30) Foreign Application Priority Data

Feb. 26, 2003 (GB) .................................. 0304358.5
Mar. 7, 2003 (GB) .................................. 0305175.2

(51) Int. Cl.
*G01C 21/00* (2006.01)

(52) U.S. Cl.
USPC ............ 701/533; 705/27.2; 705/400; 725/60; 370/464; 701/408

(58) Field of Classification Search
USPC ............ 701/201, 207, 213, 29, 33, 454, 520, 701/522, 408, 533; 342/357; 340/988; 705/27.2, 400; 725/60; 370/464; 707/E17.11
See application file for complete search history.

(56) References Cited

U.S. PATENT DOCUMENTS

| | | | |
|---|---|---|---|
| 4,164,739 A | | 8/1979 | Katagi |
| 5,839,088 A | | 11/1998 | Hancock et al. |
| 5,848,373 A | * | 12/1998 | DeLorme et al. ............. 701/455 |
| 5,859,628 A | | 1/1999 | Ross et al. |
| 6,138,072 A | * | 10/2000 | Nagai ........................... 701/454 |

(Continued)

FOREIGN PATENT DOCUMENTS

| AU | 2002324095 | 6/2002 |
|---|---|---|
| DE | 19828077 A1 | 12/1999 |

(Continued)

OTHER PUBLICATIONS

Validating GPS software and implications for the future; Mueller, L.; Lazar, S.; Golden, N.; Aerospace Applications Conference, 1990. Digest., 1990 IEEE; Digital Object Identifier: 10.1109/AERO.1990. 109071; Publication Year: 1990 , pp. 31-58.*

(Continued)

*Primary Examiner* — Cuong H Nguyen

(57) ABSTRACT

In one embodiment of the present invention, navigation software is integrated with other kinds of software running on the same device so that capabilities of the navigation software can be made available from within the other applications. In one example embodiment, those applications can export street, city or postcode format address data to the navigation software. The address data can then be converted to a co-ordinate system based address by the navigation software, which can then automatically be set as the destination address used by the navigation software in calculating the route and/or automatically marked on a map generated and displayed by the navigation software.

28 Claims, 3 Drawing Sheets

(56) References Cited

U.S. PATENT DOCUMENTS

| | | | |
|---|---|---|---|
| 6,202,023 | B1 | 3/2001 | Hancock et al. |
| 6,295,502 | B1 | 9/2001 | Hancock et al. |
| 6,374,177 | B1 | 4/2002 | Lee et al. |
| 6,597,983 | B2* | 7/2003 | Hancock ........................ 701/520 |
| 6,609,062 | B2 | 8/2003 | Hancock |
| 6,636,721 | B2* | 10/2003 | Threadgill et al. ........... 455/12.1 |
| 6,650,995 | B2 | 11/2003 | Bullock et al. |
| 7,096,233 | B2 | 8/2006 | Mori et al. |
| 7,139,835 | B2 | 11/2006 | Fouquet et al. |
| 7,487,112 | B2* | 2/2009 | Barnes, Jr. ................... 705/26.8 |
| 7,606,663 | B2* | 10/2009 | Neef et al. .................... 701/425 |
| 7,630,986 | B1* | 12/2009 | Herz et al. ............................ 1/1 |
| 2002/0044084 | A1 | 4/2002 | Itoh et al. |
| 2002/0120388 | A1 | 8/2002 | Bullock et al. |
| 2002/0120390 | A1 | 8/2002 | Bullock et al. |
| 2003/0033176 | A1* | 2/2003 | Hancock ............................ 705/6 |
| 2003/0036842 | A1 | 2/2003 | Hancock |
| 2003/0065805 | A1* | 4/2003 | Barnes, Jr. .................... 709/231 |
| 2003/0134648 | A1* | 7/2003 | Reed et al. .................... 455/456 |
| 2003/0182052 | A1 | 9/2003 | DeLorme et al. |
| 2003/0220835 | A1* | 11/2003 | Barnes, Jr. ....................... 705/14 |
| 2004/0128359 | A1* | 7/2004 | Horvitz et al. ................ 709/207 |
| 2004/0138790 | A1* | 7/2004 | Kapolka et al. ................. 701/29 |
| 2004/0252053 | A1* | 12/2004 | Harvey .................... 342/357.15 |
| 2005/0060070 | A1* | 3/2005 | Kapolka et al. ................. 701/29 |
| 2005/0266879 | A1* | 12/2005 | Spaur et al. ................ 455/556.2 |
| 2006/0068808 | A1* | 3/2006 | Karavias .................... 455/456.1 |
| 2006/0084420 | A1* | 4/2006 | Smith et al. ................... 455/420 |
| 2006/0129691 | A1* | 6/2006 | Coffee et al. ................. 709/230 |
| 2006/0235739 | A1* | 10/2006 | Levis et al. ........................ 705/9 |
| 2007/0150173 | A1 | 6/2007 | Neef et al. |
| 2007/0225902 | A1 | 9/2007 | Gretton et al. |
| 2007/0262860 | A1 | 11/2007 | Salinas et al. |
| 2008/0045234 | A1 | 2/2008 | Reed |
| 2008/0133124 | A1 | 6/2008 | Sarkeshik |
| 2009/0077100 | A1 | 3/2009 | Hancock et al. |

FOREIGN PATENT DOCUMENTS

| | | | |
|---|---|---|---|
| EP | 1253402 | A2 | 10/2000 |
| EP | 1096232 | A2 | 5/2001 |
| EP | 1178286 | | 2/2002 |
| EP | 1267146 | | 12/2002 |
| EP | 1271101 | | 1/2003 |
| EP | 1402233 | | 3/2004 |
| FR | 2677756 | | 12/1992 |
| GB | 2322445 | A | 8/1998 |
| GB | 2379270 | A | 3/2003 |
| GB | 2400175 | A | 10/2004 |
| GB | 2416844 | A | 2/2006 |
| JP | 60041032 | | 3/1985 |
| JP | 60201423 | | 10/1985 |
| JP | 62179067 | | 8/1987 |
| JP | 10027126 | | 1/1998 |
| JP | 10027126 | A * | 1/1998 |
| JP | 2000337911 | | 12/2000 |
| JP | 2004086577 | | 3/2004 |
| JP | 2004086577 | A * | 3/2004 |
| JP | 2005323137 | | 11/2005 |
| JP | 2005323137 | A * | 11/2005 |
| SU | 1401479 | | 6/1988 |
| WO | WO 01/74037 | | 10/2001 |
| WO | WO 2005/088254 | | 9/2005 |

OTHER PUBLICATIONS

Personal Information Access Using Proactive Search and Mobile Hypertext; Hyeju Jang; Seongchan Kim; Wookhyun Shin; Sung-Hyon Myaeng; Intelligent Systems, IEEE; vol. 25 , Issue: 1; Digital Object Identifier: 10.1109/MIS.2010.24 Publication Year: 2010 , pp. 27-36.*

Software Defined Radios: A Software GPS Receiver Example; Sharawi, M.S.; Korniyenko, O.V.; Computer Systems and Applications, 2007. AICCSA '07. IEEE/ACS International Conference on; Digital Object Identifier: 10.1109/AICCSA.2007.370937 Publication Year: 2007 , pp. 562-565.*

Data sources and consolidation methods for creating, improving and maintaining navigation databases; Schiff, T.H.; Vehicle Navigation and Information Systems Conference, 1993., Proceedings of the IEEE-IEE; Oct. 12-15, 1993 pp. 3-7 Digital Object Identifier 10.1109/VNIS.1993.585511.*

Geospatial Visualization using Google Maps: A Case Study onConference Presenters; Zhang, Jingyuan; Shi, Hao; Geospatial Visualization using Google Maps: A Case Study onConference PresentersZhang, Jingyuan; Shi, Hao; Computer and Computational Sciences, 2007. IMSCCS 2007. Second International Multi-Symposiums on; Aug. 13-15, 2007 pp. 472-476.*

C.-H. Huang, T.-R. Chuang, D.-P. Deng, H.-M. Lee, "Efficient GML-native Processor for Web-based GIS: Techniques and Tools," ACM GIS. Virginia USA, pp. 91-98, Nov. 2006.*

W. S. Mulvenon, K. Wang, "Integration of GIS and Educational Achievement Data for Education Policy Analysis and Decision-Making", ACM Proceedings of the 2006 International Conference on Digital Government Research, 3rd Ed., vol. 151. pp. 354-355, 2006.*

Data sources and consolidation methods for creating, improving and maintaining navigation databases; Schiff, T.H.; Vehicle Navigation and Information Systems Conference, 1993, Proceedings of the IEEE-IEE; Oct. 12-15, 1993 pp. 3-7 Digital Object Identifier 10.1109/VNIS.1993.585511.

An airborne multimode radar display processor; Felsman, J.; Iarmiello, J.W.; Digital Avionics Systems Conference, 1991. Proceedings, IEEE/AIAA 10th; Oct. 14-17, 1991 pp. 367-374; Digital Object Identifier 10.1109/DASC.1991.177194.

Small Scale European Databases and GPS Application; de Taeye, I.A.A.; Vehicle Navigation and Information Systems, 1992. VNIS, The 3rd International Conference on; Sep. 2-4, 1992 pp. 608-613.

Geospatial Visualization using Google Maps: A Case Study on Conference Presenters; Zhang, Jinguan; Shi, Hao; Computer and Computational Sciences, 2007. IMCCS 2007. Second International Multi-Symposiums on; Aug. 13-15, 2007 pp. 472-476.

E. Jeremy, J. Howell, J.R. Douceur, "MapCruncher: Integrating the World's Geographic Information", ACM SIGOPS Operating System, vol. 41, pp. 55-59, Apr. 2007.

W.S. Mulvenon, K. Wang, "Integration of GIS and Educational Achievement Data for Education Policy Analysis and Decision-Making," ACM Proceedings of the 2006 International Conference on Digital Government Research, 3rd Ed., vol. 151. pp. 354-355, 2006.

C-H. Huang, T.-R. Chuang, D.-P. Deng, H.-M. Lee, "Efficient GML-native Processor for Web-based GIS: Techniques and Tools," ACM GIS. Virginia USA, pp. 91-98, Nov. 2006.

Retrieved from the Interet:URL:www.thefreedictionary.com/device [retrieved on Feb. 16, 2009].

Retrieved from the Internet:URL:www.dictionary,die.net/device [retrieved on Feb. 16, 2009].

EPO Opposition Division's decision. Dec. 20, 2011.

* cited by examiner

NAVIGATION DEVICE AND METHOD FOR EXCHANGING DATA BETWEEN RESIDENT APPLICATIONS

PRIORITY STATEMENT

The present application is a divisional and claims priority under 35 USC §120/§121 of prior U.S. application Ser. No. 10/546,740 filed on Nov. 17, 2006 now U.S. Pat. No. 7,606,663, which is the national phase under 35 U.S.C. §371 of PCT International Application No. PCT/GB2004/000800, which has an International filing date of Feb. 26, 2004, which designated the United States of America and which claims priority on Great Britain Application No. 0304358.5 filed Feb. 26, 2003 and Great Britain Application No. 0305175.2 filed Mar. 7, 2003, the entire contents of each of which are hereby incorporated herein by reference.

FIELD

This invention relates to a navigation device, such as GPS based receiver, that can display simulated navigation data and a related method. The device finds particular application as an in-car navigation system. Data can be exchanged between applications resident on the device.

BACKGROUND

GPS based devices are well known and are widely employed as in-car navigation systems. Reference may be made to the Navigator series software from the present assignee, TomTom B.V. This is software that, when running on a PDA (such as a Compaq iPaq) connected to an external GPS receiver, enables a user to input to the PDA a start and destination address. The software then calculates the best route between the two end-points and displays instructions on how to navigate that route. By using the positional information derived from the GPS receiver, the software can determine at regular intervals the position of the PDA (typically mounted on the dashboard of a vehicle) and can display the current position of the vehicle on a map and display (and speak) appropriate navigation instructions (e.g. 'turn left in 100 m'). Graphics depicting the actions to be accomplished (e.g. a left arrow indicating a left turn ahead) can be displayed in a status bar and also be superimposed over the applicable junctions/turnings etc in the roads shown in the map itself. Reference may also be made to devices that integrate a GPS receiver into a computing device programmed with a map database and that can generate navigation instructions on a display. The term 'navigation device' refers to a device that enables a user to navigate to a pre-defined destination. The device may have an internal system for receiving location data, such as a GPS receiver, or may merely be connectable to a receiver that can receive location data.

Reference may be made to WO 01/74037, in which a mobile wireless device with a GPS receiver, able to obtain longitude and latitude information, sends that information to a remote web server over a wireless network for reverse geocoding—i.e. determining the street address from the latitude and longitude. That street address is then sent back to the wireless device over the wireless network to enable the device to display its location in street/city format.

SUMMARY

In a first aspect, there is a navigation device programmed with a map database and navigation software that enables a route to be planned between two user-defined places, wherein the device is further programmed to be able to display a menu option that, if selected, causes the automatic export of street, city format or postcode format address data from an application resident on the device to the navigation software resident on the device for processing.

By providing navigation software on the same device as the application with street, city or postcode format address data, and enabling export of that data from the application to the navigation software, it is possible for the device to rapidly process that data in new and useful ways. For example, selection of the menu option may initiate the conversion of the address data to a co-ordinate system based address by the navigation software, which can then automatically be set as the destination address used by the navigation software in calculating the route and/or automatically marked on a map generated and displayed by the navigation software.

Further, the co-ordinate system based address may be automatically returned to the application (or a different application resident on the device) and stored as part of the data held by or accessible by that application.

BRIEF DESCRIPTION OF THE DRAWINGS

The present invention will be described with reference to the accompanying drawings, in which.

DETAILED DESCRIPTION OF THE EXAMPLE EMBODIMENTS

System Overview

The present invention is implemented in software from TomTom B.V. called Navigator. Navigator software runs on a touch screen (i.e. stylus controlled) Pocket PC powered PDA device, such as the Compaq iPaq. It provides a GPS based navigation system when the PDA is coupled with a GPS receiver. The combined PDA and GPS receiver system is designed to be used as an in-vehicle navigation system. The invention may also be implemented in any other arrangement of navigation device, such as one with an integral GPS receiver/computer/display, or a device designed for non-vehicle use (e.g. for walkers) or vehicles other than cars (e.g. aircraft). The navigation device may implement any kind of position sensing technology and is not limited to GPS; it can hence be implemented using other kinds of GNSS (global navigation satellite system) such as the European Galileo system. Equally, it is not limited to satellite based location/velocity systems but can equally be deployed using ground-based beacons or any other kind of system that enables the device to determine its geographic location.

Figure 1:
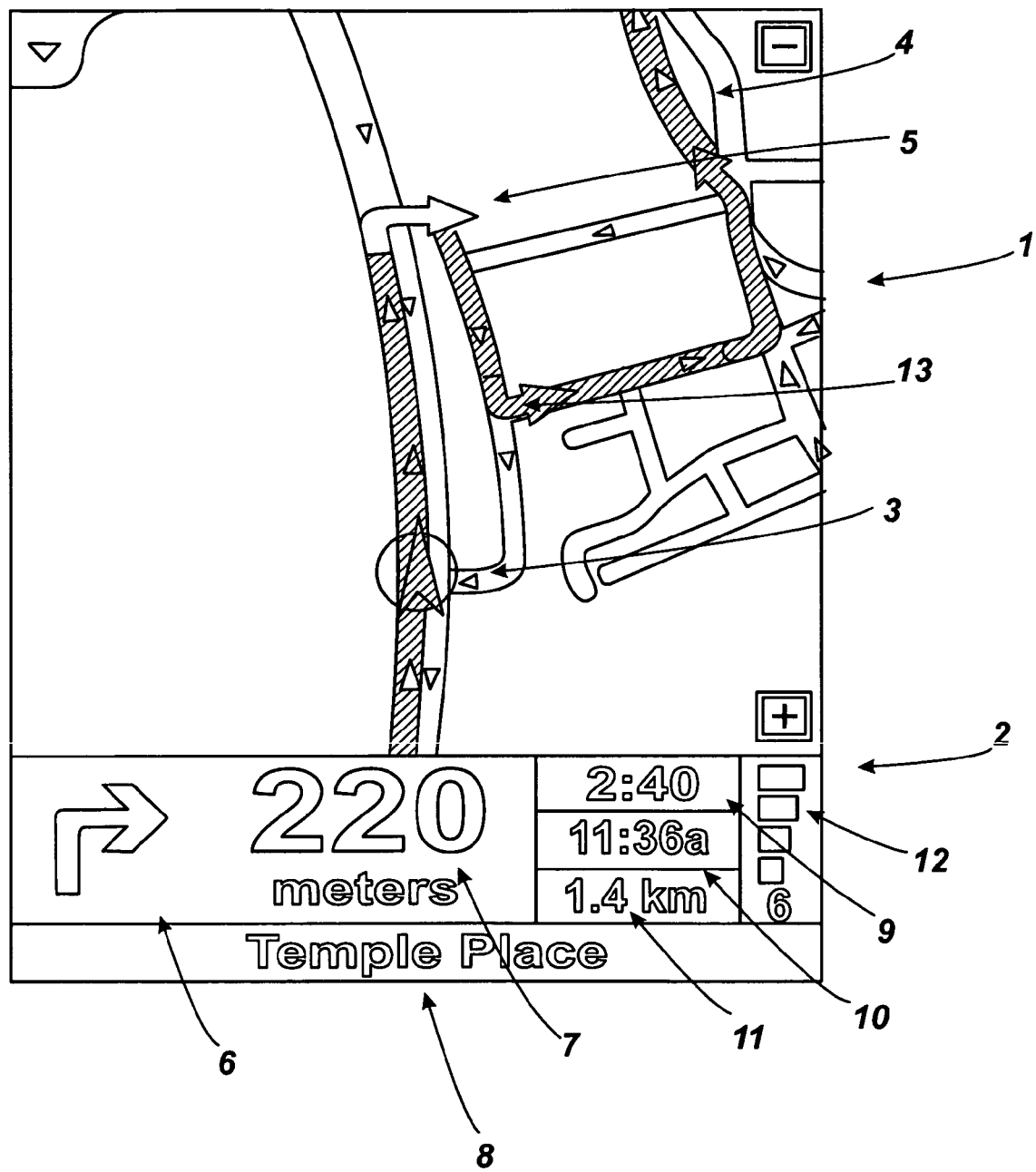
FIG. 1 is a screen shot from a navigation device implementing the present invention; the screen shot shows a plan map view and a status bar running along the bottom of the display.
Figure 2:
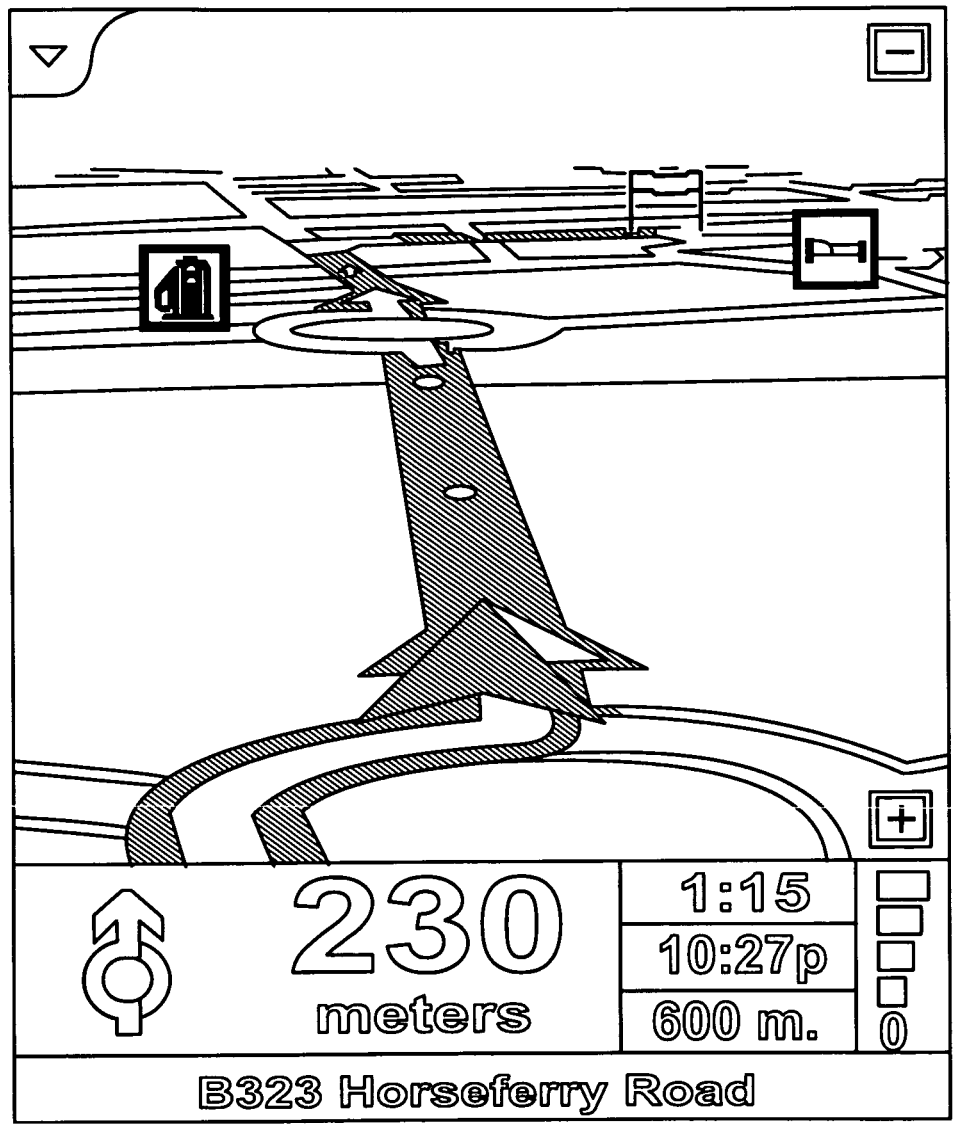
FIG. 2 is a screen shot from the navigation device implementing a 3-D view.

Navigator software, when running on a PDA, results in a navigation device that causes the normal navigation mode screen shown in FIG. 1 to be displayed. This view provides driving instructions using a combination of text, symbols, voice guidance and a moving map. Key user interface elements are the following: a 2-D map 1 occupies most of the screen. The map shows the user's car and its immediate surroundings, rotated in such a way that the direction in which the car is moving is always "up". Running across the bottom quarter of the screen is the status bar 2. The current location of the device, as the device itself determines using conventional GPS location finding and its orientation (as inferred from its direction of travel) is depicted by an arrow 3. The route calculated by the device (using route calculation algorithms stored in device memory as applied to map data stored in a map database in device memory) is shown as darkened path 4 superimposed with arrows giving the travel direction. On the darkened path 4, all major actions (e.g. turning corners, crossroads, roundabouts etc.) are schematically depicted by arrows. 5 overlaying the path 4. The status bar 2 also includes at its left hand side a schematic 6 depicting the next action (here, a right turn). The status bar 2 also shows the distance to the next action (i.e. the right turn-here the distance is 220 meters) as extracted from a database of the entire route calculated by the device (i.e. a list of all roads and related actions defining the route to be taken). Status bar 2 also shows the name of the current road 8, the estimated time before arrival 9 (here 2 minutes and 40 seconds), the actual estimated arrival time 10 (11.36 am) and the distance to the destination 11 (1.4 Km). The GPS signal strength is shown in a mobile-phone style signal strength indicator 12.

If the user touches the centre of the screen 13, then a navigation screen menu is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

Figure 3:
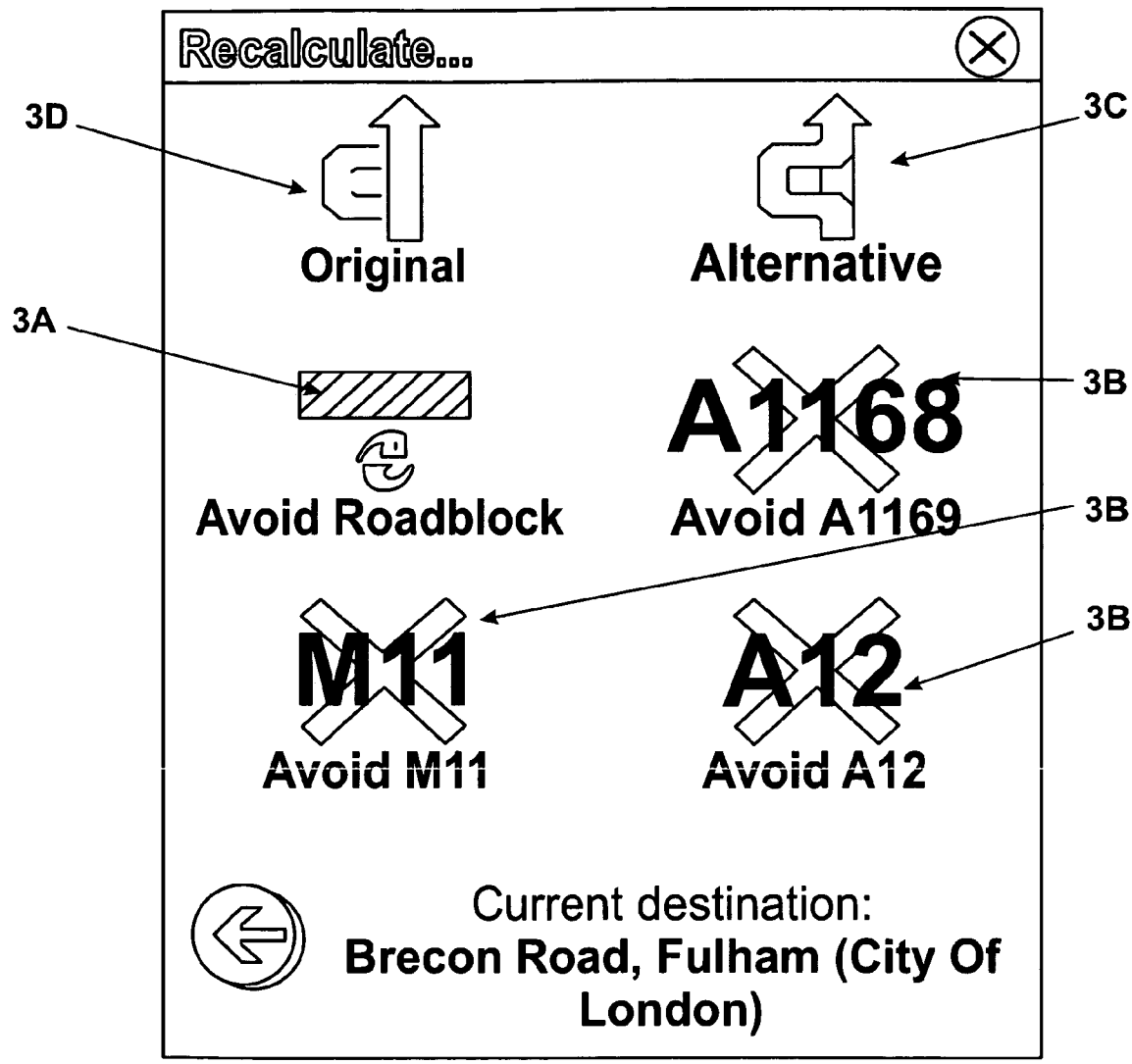
FIG. 3 is a screen shot from the navigation device showing various route planning functions that enable a user to require the device to plot a new route to the destination that (i) is an alternative route; (ii) avoids a roadblock immediately ahead; (iii) avoids predefined roads or (iv) is a reversion to the original route.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 13) is a deliberate design feature of this implementation. Unlike other stylus based applications, this design feature is consistently deployed throughout Navigator to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 cm$^2$ and will typically be a square zone. In normal navigation mode, the device displays a map. Touching the map (i.e. the touch sensitive display) once (or twice in a different implementation) near to the screen centre (or any part of the screen in another implementation) will then call up a navigation menu (see FIG. 3) with large icons corresponding to various navigation functions, such as the option to calculate an alternative route, and re-calculate the route so as to avoid the next section of road (useful when faced with an obstruction or heavy congestion); or recalculate the route so as to avoid specific, listed roads.

The actual physical structure of the device itself may be fundamentally no different from any conventional handheld computer, other than the integral GPS receiver or a GPS data feed from an external GPS receiver. Hence, memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software running on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

A core characteristic of Navigator is that it presents an open interface to other applications resident on the device. Hence, those other applications can readily send data to Navigator software for Navigator to process and receive data from Navigator. This enables various new and powerful techniques, some of which are described below.

Geocoding

The Navigator software is programmed with the WGC84 (or other co-ord system) co-ordinates of roads and house numbers along a road. Hence, when a user defines a start or destination street/city or postcode address as part of the normal route planning process, the software determines the associated WGC84 co-ordinates (this process is called 'geocoding'); it can then also mark the start and destination positions on the maps it can display with appropriate icons. Navigator can share this geocoding capability with other applications (e.g. make it seamlessly and automatically available from within those applications).

Integration Between Navigator and Contacts Application

It is possible to auto-generate an option, displayed within a contacts application running on the device, to navigate to that contact within the Navigator program. Hence, when viewing a contact record in the contacts application, one of the available menu items is a function 'navigate to': if selected, this automatically opens the Navigator software, causes the export of the street, city or postcode format address used in the contacts application to Navigator, which then geocodes that contact address and automatically sets that geocoded contact address as the destination.

As a further example, it is possible to show the location of the contact address on the maps displayed by Navigator: an option 'show on map' may hence be selected for a given contact address from within the contacts application. If selected, then the contact address, in street, city or postcode format, is exported to the Navigator software, which then geocodes it and displays on a map it generates a suitable icon at the appropriate location. This icon can be annotated with suitable information (e.g. contact name and address; possibly a thumbnail photo image of the contact).

Pass Back of Geocoded Data

Navigator software also enables WGC 84 (or other co-ordinate) system data to be added automatically to a street/city etc. address in a contacts application or other application by using the co-ordinate system knowledge of the integrated Navigator navigation program. The user can, from within the contacts application, select a 'geocode address' function to be performed in relation to a specific address (or a bulk group of addresses). The contacts application hence exports the contact address from the database used by it (in house number, street, city format or postcode format) to the engine in the Navigator software that converts addresses expressed in these formats to WGC84 co-ordinates. This engine then determines the WGC84 co-ordinates and returns that WGC84 data to a new field in the database used by the contacts application—the new field stores and makes available the WGC84 data within the contacts application (or indeed other applications, not only running on the device but also resident on remote devices). Being able to automatically add a geocoded location (e.g. the WGC 84 format location) of an address to the normal street, city etc. format address stored in (or otherwise accessible by) a contacts application is very powerful because many location based services will use geocoded data.

For example, business cards in vCard format often include an address in street, city format. With the present invention, a vCard received via e-mail or short range wireless etc. by the device can be processed by the device extracting the street address and sending that for geocoding by the resident Navigator application; the geocoded data can then be returned to the contacts database storing the vCard data to augment that data. This can facilitate many kinds of location based services that rely on geocoded data; for example, imagine that the vCard recipient is a sales person and the vCard is from a customer; after the vCard address has been geocoded, the device will have (and can download to a server) a geocoded database of all customer contacts. Then, it will be far simpler to implement future activities that rely on accurate knowledge of customer locations, such as making service calls or delivering goods, since this will often be done using software that requires geocoded data.

Integration Between Navigator and a Messaging Application

As another example, presence data will become a pervasive characteristic of personal mobile communications; a mobile telephone user's presence data defines the status of that user across many parameters (e.g. whether contactable by voice, data, SMS etc; current activity; current mood; physical or logical (e.g. work; home) location etc.). Presence data may be widely accessible to third parties; this enables in theory someone to determine the location of a friend etc. whose presence derived location data they have access to and can see (typically in a messaging application).

But that location data will often be in a geocoded format—interpreting a geocoded address is inherently difficult for people. With the present implementation, real-time geocoded data incoming to a device can be passed through to the Navigator software on that device for display on a map generated by Navigator. This makes locating the person straightforward. In addition, Navigator can also reverse geocode—namely, determine the associated street, city etc, format from input geocoded data. Then, if the user is interested in viewing the presence data, he can also see a normal street, city format location address (generated by the Navigator software by reverse geocoding) as well. This can be included as an annotation to the POI marking the location on the Navigator generated map of the location of the person whose presence data has been obtained. That annotation can also include other kinds of presence data (e.g. mood, current activity etc.).

Integration Between Navigator and a Browser Application

Navigator software functionality can be integrated with a browser running on the device as follows: when the device displays a web page (or other kind of mark up language page) that includes an address in street, city or in postcode format, a user can readily take that address and send it to the Navigator software for it to display a map showing the actual location. This can be done with a browser plug-in that allows a user to select the address in the web page (e.g. highlight it); a drop down menu can then be selected. This menu includes the options 'Show location in Navigator' and 'Drive to this location'. Selecting the 'Show location in Navigator' option causes the automatic export of the address to Navigator, which then geocodes it and displays a map indicating the actual location. Selecting the 'Drive to this location' option causes the automatic export of the address to Navigator, which then geocodes it and uses the geocoded address as the destination address to calculate a route.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A non-transitory computer-readable medium which stores a set of instructions which when executed performs a method of displaying information on a navigation device programmed with a map database and navigation software that enables route calculation to a destination, the method executed by the set of instructions comprising:

running a contacts application on the navigation device;
displaying a selectable menu icon of a contact record on a touch screen of the navigation device;
exporting a contact address used in the contacts application, the contact address including street, city format and/or postcode format address data, upon the selectable menu icon being selected via the touch screen, to a navigation application run by a processor of the navigation device;
automatically setting an address associated with the exported contact address as the destination used in the route calculation by the navigation application; and
displaying a route to the destination based on the route calculation via the navigation device.

2. A method of displaying information on a navigation device programmed with a map database and navigation software that enables route calculation to a destination, the method comprising:
running a contacts application on the navigation device;
displaying a selectable menu icon of a contact record on a touch screen of the navigation device;
exporting a contact address used in the contacts application, the contact address including street, city format and/or postcode format address data, upon the selectable menu icon being selected via the touch screen, to a navigation application run by a processor of the navigation device;
automatically setting an address associated with the exported contact address as the destination used in the route calculation by the navigation application; and
displaying a route to the destination based on the route calculation via the navigation device.

3. The method of claim 2, wherein, if a web page includes an address in street, city or postcode format, then the address of the web page is set to the navigation application and the navigation application then displays a map showing the location of the address of the web page.

4. The method of claim of claim 2, wherein the selectable menu icon is a "navigate to" icon, and wherein selection of the "navigate to" icon initiates a conversion of address data of the address used in the contacts application to a co-ordinate system based address by the navigation application, without any further user interaction with the navigation device.

5. The method of claim 2, wherein the selectable menu icon is sized to at least 0.7 cm$^2$ in area.

6. The method of claim 2, wherein a WGC84 co-ordinate system based address is automatically returned to an application resident on the navigation device and is stored as part of the data held by or accessible by the application.

7. The method of claim 2 further comprising geocoding the exported contact address.

8. The method of claim 7, wherein the geocoded contact address is used by the navigation device in a location based service.

9. The method of claim 7, wherein the navigation application is configured to provide its geocoding function to the contacts application by receiving non-geocoded location data from the contacts application, deriving corresponding geocoded location data and returning the derived geocoded location data to the contacts application.

10. The method of claim 7, wherein the navigation application is configured to provide a reverse geocoding function to the contacts application by receiving geocoded location data from the navigation application, deriving corresponding non-geocoded location data in street, city format and returning the derived street, city format location data to the contacts application.

11. The method of claim 7, wherein geocoded data, incoming to the navigation device from an external source, is passed through to the navigation application and the location associated with the geocoded data is then displayed on a map generated by the navigation application.

12. The method of claim 11, wherein the processor is further configured to run a messaging application, the geocoded data being part of data handled by the messaging application.

13. The method of claim 12, wherein the geocoded data relates to presence data received by the navigation device.

14. The method of claim 7, wherein the navigation application reverse geocodes the geocoded data, incoming to the navigation device, to generate a street, city format address.

15. The method of claim 14, wherein the street city format address is displayed as an annotation to a POI on a map generated by the navigation application.

16. A method of displaying information on a navigation device programmed with a map database and navigation software that enables a route to be planned to a destination, the method comprising:
displaying a menu option on a display of the navigation device;
exporting address data to the navigation software, upon the displayed menu item being selected, the exported address data being street, city format and/or postcode format address data sent by an application resident on the navigation device;
automatically setting an address associated with the exported address data as the destination used by the navigation software in planning the route; and
displaying the planned route via the navigation device.

17. The method of claim 16, wherein the automatically set address is a co-ordinate system based address.

18. The method of claim 17, wherein the co-ordinate system based address is automatically marked on a map generated and displayed by the navigation software.

19. The method of claim 16, wherein the navigation software is configured to provide a geocoding function of the navigation software, to the application by receiving non-geocoded location data from the application, deriving corresponding geocoded location data and returning the derived corresponding geocoded location data to the application.

20. The method device of claim 16, wherein the navigation software is configured to provide a reverse geocoding function to another application by receiving geocoded location data from the another application, deriving corresponding non-geocoded location data in street, city format and returning the derived non-geocoded location data in street, city format to the application.

21. The method of claim 16, wherein the application resident on the navigation device is a contacts application.

22. The method of claim 16, wherein the application resident on the navigation device is a browser application.

23. The method of claim 20, wherein the application resident on the navigation device is a messaging application.

24. The method of claim 23, wherein the location data is part of presence data.

25. The method of claim 21, wherein the menu option is an option to navigate to an address in the contacts application and selecting that option automatically deploys the navigation software and sets the address as the destination address.

26. The method of claim 21, wherein the menu option is an option to show on a map an address in the contacts application and selecting that option automatically deploys the navigation software and causes the location of the address to be indicated on a map.

27. The method of claim 17, wherein the co-ordinate system based address is automatically returned to the application resident on the navigation device, and is stored as part of the data held by or accessible by the application.

28. A non-transitory computer-readable medium which stores a set of instructions which when executed performs a method of displaying information on a navigation device programmed with a map database and navigation software that enables a route to be planned to a destination, the method executed by the set of instructions comprising:
- displaying a menu option on a display of the navigation device;
- exporting address data to the navigation software, upon the displayed menu item being selected, the exported address data being street, city format and/or postcode format address data sent by an application resident on the navigation device;
- automatically setting an address associated with the exported address data as the destination used by the navigation software in planning the route; and
- displaying the planned route via the navigation device.

\* \* \* \* \*